(12) United States Patent
Imajou (10) Patent No.: US 7,878,595 B2
(45) Date of Patent: Feb. 1, 2011

(54) PIVOT MECHANISM

(75) Inventor: Taku Imajou, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 217 days.

(21) Appl. No.: 11/794,172

(22) PCT Filed: Dec. 13, 2005

(86) PCT No.: PCT/JP2005/022849
§ 371 (c)(1),
(2), (4) Date: Jun. 26, 2007

(87) PCT Pub. No.: WO2006/073044
PCT Pub. Date: Jul. 13, 2006

(65) Prior Publication Data
US 2008/0121778 A1    May 29, 2008

(30) Foreign Application Priority Data
Jan. 4, 2005    (JP) .................... 2005-000087

(51) Int. Cl.
*B60N 2/235*    (2006.01)

(52) U.S. Cl. .............. 297/367 R; 297/378.11; 297/378.12; 297/378.13; 297/378.1

(58) Field of Classification Search .......... 297/291, 297/292, 293, 301.1, 301.3, 301.4, 378.11, 297/378.12, 378.13, 378.1, 367 R
See application file for complete search history.

(56) References Cited

U.S. PATENT DOCUMENTS

| 376,886 | A | * | 1/1888 | Holden ................... 297/292 |
| 478,131 | A | * | 7/1892 | Richards ................ 297/291 |
| 3,866,270 | A | * | 2/1975 | Suzuki et al. ............ 16/324 |
| 3,926,474 | A | * | 12/1975 | Johndrow et al. ..... 297/354.12 |
| 4,756,577 | A | * | 7/1988 | Berg et al. ............ 297/378.11 |
| 5,205,610 | A | * | 4/1993 | Reninger ................. 297/380 |

(Continued)

FOREIGN PATENT DOCUMENTS

DE    102 28 940 C1    6/2003

(Continued)

*Primary Examiner*—Terrell Mckinnon
*Assistant Examiner*—Michael McDuffie
(74) *Attorney, Agent, or Firm*—Patterson Thuente Christensen Pedersen, P.A.

(57) ABSTRACT

Operation force required for pivot operation of a movable body can be set almost constant independent of variation in the angular position of the pivoting. A pivot mechanism (tumble mechanism (10A)) has a floor-side member (B) fixed to a predetermined position; a seat-side member (12) connected to the floor side member (B) by hinge coupling so as to be pivotable in a predetermined angle range; and a torsion spring member (14) provided to urge the seat side member (12) in the opposite direction to gravity that acts on the seat side member (12). The pivot mechanism is constructed such that weight moments about a pivot center (13a) acting on the seat-side member (12) as the pivot mechanism move varies. The torsion spring member (14) has an urging the section (14b) for urging the seat seat member (12) and a support section (14a) that is supported by the floor side member (B). The support section (14b)is disposed at a position between a pivot track of the urging section (14b) produced by the pivoting of the pivot mechanism and the pivot center (13a).

10 Claims, 7 Drawing Sheets

U.S. PATENT DOCUMENTS

| | | | | |
|---|---|---|---|---|
| 5,390,980 | A * | 2/1995 | Premji et al. | 297/378.12 |
| 5,547,254 | A * | 8/1996 | Hoshihara | 297/367 R |
| 5,558,403 | A * | 9/1996 | Hammoud et al. | 297/378.12 |
| 5,800,017 | A * | 9/1998 | Sylvain et al. | 297/367 R |
| 6,113,190 | A * | 9/2000 | Negi et al. | 297/378.1 |
| 6,199,953 | B1 * | 3/2001 | Chen | 297/367 R |
| 6,220,664 | B1 * | 4/2001 | Lee | 297/301.7 |
| 6,502,903 | B2 * | 1/2003 | Bruck et al. | 297/378.11 |
| 6,601,921 | B1 * | 8/2003 | Collins | 297/378.12 |
| 6,685,270 | B2 * | 2/2004 | Haglund | 297/367 R |
| 6,709,056 | B2 * | 3/2004 | Bock | 297/300.4 |
| 6,789,849 | B2 * | 9/2004 | Gray | 297/378.12 |
| 7,344,195 | B2 * | 3/2008 | Folkert et al. | 297/378.1 |
| 7,631,936 | B2 * | 12/2009 | Fukukawa et al. | 297/292 |
| 2003/0146652 | A1 * | 8/2003 | Su | 297/301.3 |
| 2009/0079246 | A1 * | 3/2009 | Okura et al. | 297/301.4 |

FOREIGN PATENT DOCUMENTS

| | | |
|---|---|---|
| JP | 62-053055 | 3/1987 |
| JP | 6-7548 | 2/1994 |
| JP | 11-099859 | 4/1999 |
| JP | 2000-102438 | 4/2000 |
| JP | 2004-016480 | 1/2004 |

* cited by examiner

PIVOT MECHANISM

TECHNICAL FIELD

The present invention relates to a pivot mechanism. More particularly, the present invention relates to a pivot mechanism which has a stationary body and a movable body that are relatively pivotally coupled together by hinge coupling, and in which the movable body is connected to a torsion spring member so as to be biased in one of the pivot directions.

BACKGROUND ART

In a construction of a known pivot mechanism, a movable body is hinged to a stationary body that is fixed to a desired position. Further, in a pivot mechanism in which a pivot operation is performed to upwardly pivot a heavy object such as a seat, e.g., in a tumble mechanism for a vehicle seat, a biasing spring may be provided for assisting this operation. Known examples of the biasing spring include a torsion spring member that is formed to a spiral-shape or a torsion bar-shape. The torsion spring member is positioned at a hinge coupling portion. One end of the torsion spring member is connected to a floor-side member mounted on a vehicle floor, which member constitutes the stationary body. The other end of the torsion spring member is connected to a seat-side member mounted on the seat, which member constitutes the movable body. Further, the torsion spring member is assembled in a previously twisted condition, so as to bias the seat in the pivot direction opposite to the gravitational force. Thus, when the seat is upwardly pivoted, a biasing force can be exerted to the seat due to restoration of the torsion spring member. Therefore, it is possible to reduce an operation force required for performing such an upward pivot operation. To the contrary, when the upwardly pivoted seat is downwardly pivoted in a direction of the gravitational force, the above-mentioned biasing force may function as a resistance force. Therefore, when the seat is operated to be downwardly pivoted, such a downward pivot operation is assisted such that the seat can be prevented from being excessively rapidly downwardly pivoted.

Patent Document 1 mentioned below discloses an example of the pivot mechanism as described above.

DISCLOSURE OF THE INVENTION

Problems to be Solved by the Invention

However, according to the above-mentioned prior-art, it is possible to reduce an operation force required for pivoting the movable body (seat) by means of the torsion spring member. However, a degree of reduction of the operation force may vary depending on an angular position of pivot. Thus, for example, a behavior of the movable body may be abruptly changed. As a result, the operation force required for the pivot operation cannot be stabilized, so that the operation cannot be performed smoothly.

As is generally known, torque generated by the torsion spring member increases linearly as a twist angle increases. On the other hand, gravitational moments about a pivot center acting on the movable body may change in a manner similar to a sine curve as the angular position of pivot of the movable body changes. Thus, the difference between an action moment due to the torque of the torsion spring member and an action moment due to the gravitational force may change according to the angular position of pivot of the movable body. As a result, the operation force required for the pivot operation cannot be stabilized, because such a force may change depending on this difference.

The present invention has been made in order to solve the above-mentioned problems. It is one object of the present invention to enable control of torque produced by a torsion spring member, so that an operation force required for a pivot operation of a movable body can be substantially stabilized regardless of changes of an angular position of pivot thereof.

Means for Solving the Problems

In order to achieve the above-described object, a pivot mechanism of the present invention is constructed as follows.

A first invention relates to a pivot mechanism which includes a stationary body fixed to a desired position, a movable body coupled to the stationary body by hinge coupling so as to be pivotable within a predetermined angle range, and a torsion spring member arranged to bias the movable body in a pivot direction opposite to the gravitational force acting on the movable body. The pivot mechanism is constructed such that gravitational moments about a pivot center acting on the movable body can be changed depending on pivoting thereof. The torsion spring member has a biasing section for biasing the movable body and a support section supported on the stationary body. The support section is positioned at a position between a pivot trajectory of the biasing section produced by pivoting of the pivot mechanism and the pivot center of the pivot mechanism.

Further, the torsion spring member may include spring members generating torque that can change depending upon the twist angle thereof, e.g., a coil spring, a spiral spring and a torsion spring.

According to the first invention, when the movable body pivots about the pivot center, a rate of change of a pivot angle thereof and a rate of change of the twist angle of the torsion spring member are always different from each other. In particular, in the predetermined angular range in which the movable body can pivot, there are a region in which the rate of change of the pivot angle of the movable body is greater than the rate of change of the twist angle of the torsion spring member and a region in which the former is smaller than the latter. The rate of change of the twist angle of the torsion spring member may change in a curve with respect to the change of the pivot angle of the movable body. That is, torque generated by the torsion spring member changes in a curve with respect to the change of the pivot angle of the movable body. The shape of the curve may change depending on an arrangement of the support section and the biasing section of the torsion spring member. Therefore, by changing the arrangement of these sections, the shape of the curve of the torque generated by the torsion spring member can be approximated to a change curve of the gravitational moments acting on the movable body.

A second invention relates to the first invention described above, in which the support section of the torsion spring member is disposed in a position closer to the pivot center than the biasing section.

According to the second invention, a difference between a distance from the support section to the biasing section of the torsion spring member and a distance from the pivot center to the biasing section can be reduced. As a result, a difference between the rate of change of the pivot angle of the movable body and the rate of change of the twist angle of the torsion spring member is also reduced. In addition, the curve of the torque generated by the torsion spring member has a relatively gentle curved shape.

A third invention relates to the first invention described above, in which the pivot mechanism is a mechanism for pivoting a vehicle seat with respect to a vehicle floor or a mechanism for pivoting a movable component of the vehicle seat.

According to the third invention, a pivot operation of the vehicle seat with respect to the vehicle floor or a pivot operation of the movable component can be performed by the pivot mechanism.

A fourth invention relates to the second invention described above, in which the pivot mechanism is a mechanism for pivoting a vehicle seat with respect to a vehicle floor or a mechanism for pivoting a movable component of the vehicle seat.

According to the fourth invention, a pivot operation of the vehicle seat with respect to the vehicle floor or a pivot operation of the movable component can be performed by the pivot mechanism.

A fifth invention relates to the third invention described above, in which the movable body is a seat-side member fixed to the vehicle seat, wherein the stationary body comprises a floor-side member fixed to the vehicle floor, wherein the vehicle seat can be changed to a folded posture in which the seat back is folded onto a seat cushion by a reclining mechanism for controlling an inclination angle of a seat back, and wherein the vehicle seat is pivoted with respect to the vehicle floor in the folded condition.

According to the fifth invention, a pivot operation of a heavy object, i.e., the vehicle seat in the folded posture, can be performed via the pivot mechanism.

A sixth invention relates to the fourth invention described above, in which the movable body is a seat-side member fixed to the vehicle seat, wherein the stationary body comprises a floor-side member fixed to the vehicle floor, wherein the vehicle seat can be changed to a folded posture in which the seat back is folded onto a seat cushion by a reclining mechanism for controlling an inclination angle of a seat back, and wherein the vehicle seat is pivoted with respect to the vehicle floor in the folded condition.

According to the sixth invention, a pivot operation of a heavy object, i.e., the vehicle seat in the folded posture, can be performed via the pivot mechanism.

A seventh invention relates to the fifth invention described above, in which the torsion spring member is a spiral spring.

According to the seventh invention, the torsion spring member composed of the spiral spring has a spiral configuration that is not spread in the axial direction. Therefore, the torsion spring member can be arranged compactly in the axial direction.

An eighth invention relates to the sixth invention described above, in which the torsion spring member is a spiral spring.

According to the eighth invention, the torsion spring member composed of the spiral spring has a spiral configuration that is not spread in the axial direction. Therefore, the torsion spring member can be arranged compactly in the axial direction.

EFFECTS OF THE INVENTION

The present invention thus constructed may provides the following effects.

First, according the first invention, the torque generated by the torsion spring member can be changed in a curve with respect to the change of the pivot angle of the movable body. Therefore, as compared with a case in which the generated torque of the torsion spring member changes linearly, the generated torque curve can be easily controlled to approximate a curve of the gravitational moment acting on the movable body. That is, an operation force required for a pivot operation of the movable body can be easily controlled to be substantially stabilized regardless of changes of an angular position of pivot thereof.

Further, according to the second invention, the generated torque curve of the torsion spring member can be controlled so as to have a relatively gentle shape. Therefore, changes of the operation force required for the pivot operation of the movable body can be reduced, so that the operation force can be further stabilized.

Further, according to the third invention, the pivot operation of the vehicle seat with respect to the vehicle floor or the pivot operation of the movable component can be performed with a substantially constant small force via the pivot mechanism.

Further, according to the fourth invention, the pivot operation of the vehicle seat with respect to the vehicle floor or the pivot operation of the movable component can be performed with a substantially constant small force via the pivot mechanism.

Further, according to the fifth invention, the pivot operation of a heavy object, i.e., the vehicle seat in the folded posture, can be performed with a substantially constant small force via the pivot mechanism.

Further, according to the sixth invention, the pivot operation of a heavy object, i.e., the vehicle seat in the folded posture, can be performed with a substantially constant small force via the pivot mechanism.

Further, according to the seventh invention, the torsion spring member can be compactly adapted in a width direction of the vehicle seat.

Further, according to the eighth invention, the torsion spring member can be compactly adapted in a width direction of the vehicle seat.

DESCRIPTION OF SYMBOLS 1 vehicle seat
2 seat cushion (stationary body)
3 seat back (movable body)
10A, 10B tumble mechanism (pivot mechanism)

12 seat-side member
12a engagement pin
12b engagement portion
13 hinge portion
13a pivot center
14 torsion spring member
14a support section
14b biasing section
20 lock mechanism
21 hook
30A, 30C reclining mechanism (pivot mechanism)
31 pivot center
F vehicle floor
B floor-side member
De1, De2, De3 pivot start position
Ar1, Ar2 pivot end position
Ar3 raised position
Bs stopper
S striker
θ pivot angle
α twist angle
T generated torque
Tc1, Tc2, Tc3 generated torque curve
M gravitational moments
Mc1, Mc2, Mc3 gravitational moment curve
G center of gravity of seat
L1, L2, L3 distance

BEST MODES FOR CARRYING OUT THE INVENTION

Some embodiments according to the best modes for carrying out the present invention will now be described with reference to the drawings.

First Embodiment

Figure 1:
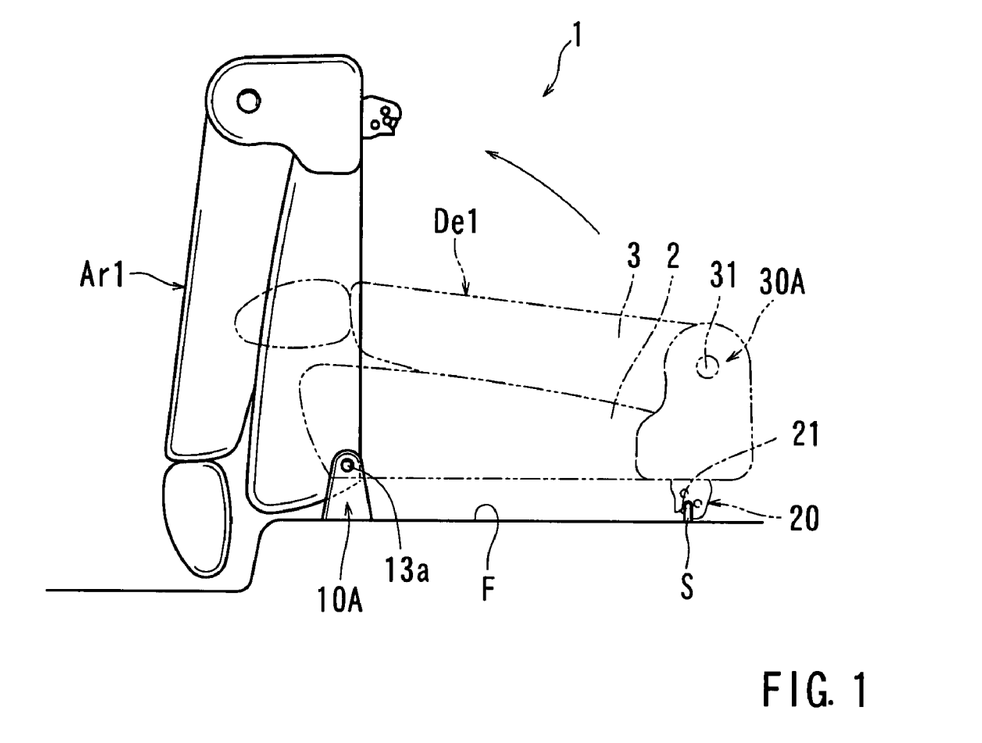
FIG. 1 is a view illustrating an appearance of a vehicle seat according to a first embodiment of the present invention.
Figure 2:
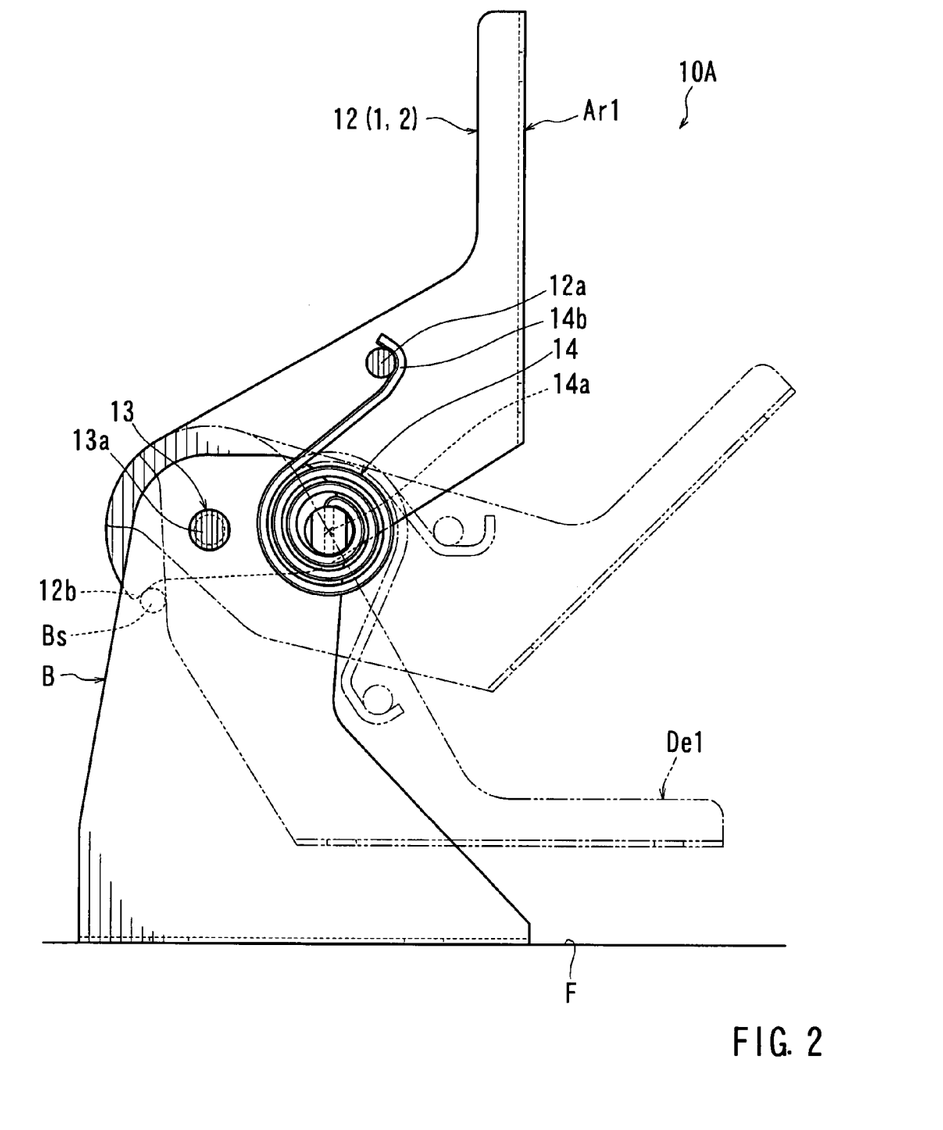
FIG. 2 is a view illustrating a construction of a tumble mechanism.
Figure 3:
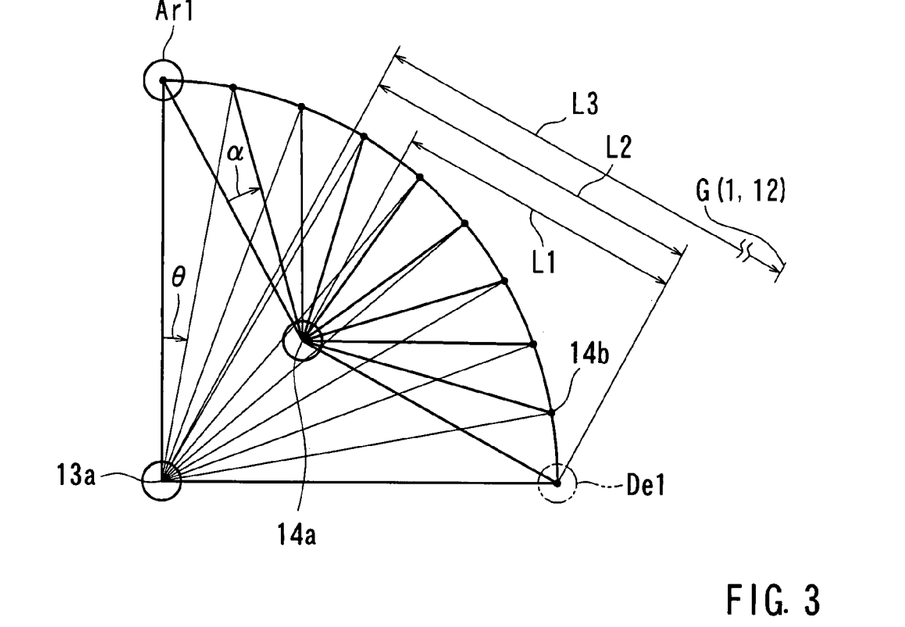
FIG. 3 is a view schematically illustrating a relation between a pivot angle and a twist angle.
Figure 4:
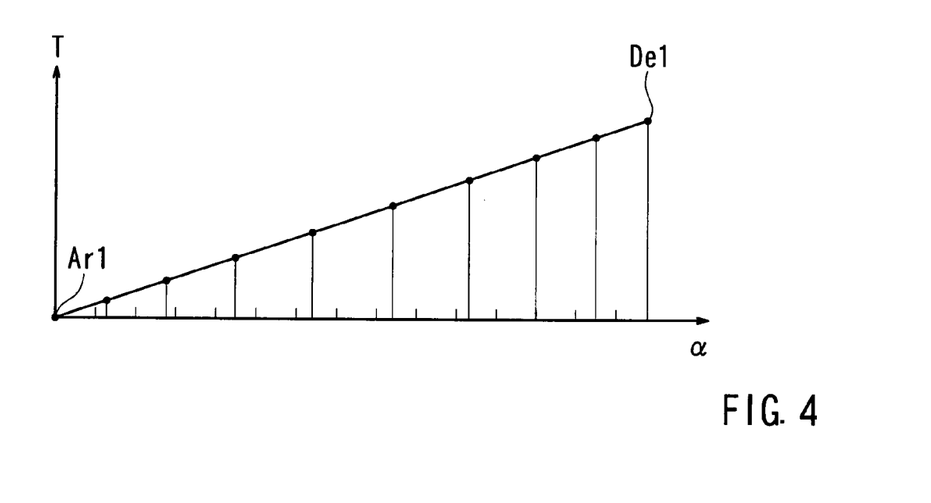
FIG. 4 is a view illustrating a relation between the twist angle of a torsion spring member and torque generated thereby.
Figure 5:
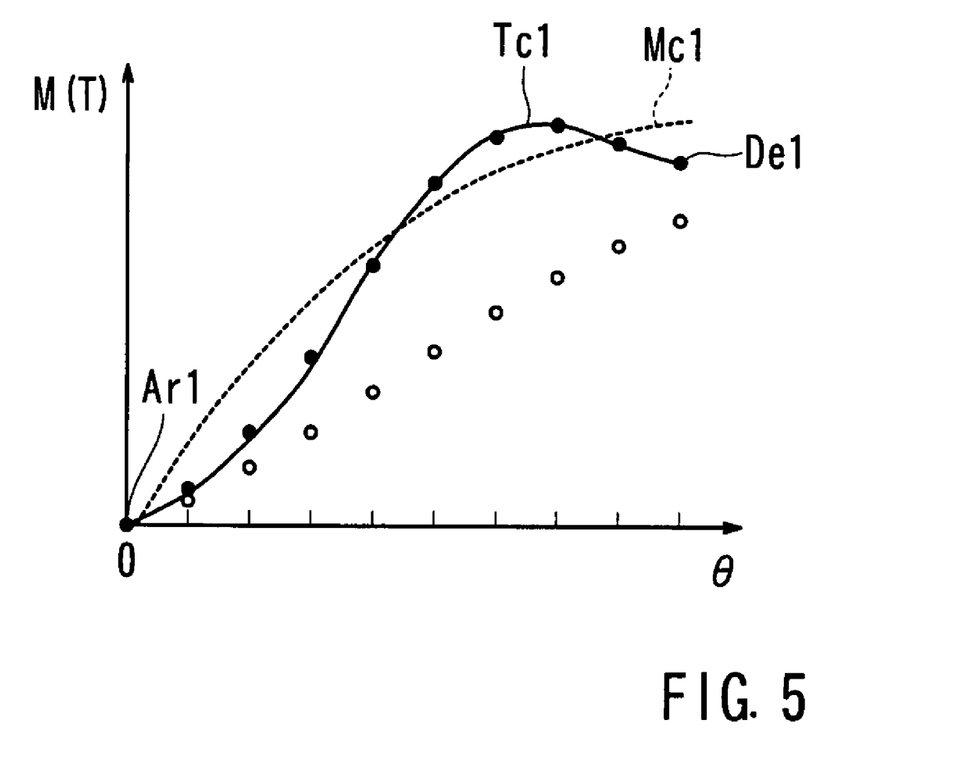
FIG. 5 is a view illustrating a relation between the pivot angle and respective action moments.

First, a construction of a pivot mechanism according to a first embodiment of the present invention will be described with reference to FIGS. 1 to 5. FIG. 1 is a view illustrating an appearance of a vehicle seat 1. FIG. 2 is a view illustrating a construction of tumble mechanisms 10A. FIG. 3 is a view schematically illustrating a relation between a pivot angle θ and a twist angle α. FIG. 4 is a view illustrating a relation between the twist angle α of a torsion spring member 14 and torque T generated thereby. FIG. 5 is a view illustrating a relation between the pivot angle θ and respective action moments. Further, in a plane of FIGS. 1 and 2, a left-hand direction corresponds to a forward direction of a vehicle, and an upward direction corresponds to an upward direction of the vehicle. As best shown in FIG. 1, the pivot mechanism of this embodiment is formed as the tumble mechanisms 10A for upwardly pivoting the vehicle seat 1 (hereinafter simply referred to as seat 1) toward a retracted position in the front of the vehicle under a condition that a seat back 3 is folded onto a seat cushion 2.

A front side of the seat 1 is supported by the tumble mechanisms 10A provided on a vehicle floor F, and a rear side of the seat 1 is supported by lock mechanisms 20. A lower end portion of the seat back 3 is supported by a reclining mechanism 30A provided to a rear end of the seat cushion 2, so as to be rotated about a pivot center 31. The reclining mechanism 30A supports the seat back 3 such that an inclination angle of the seat back 3 can be controlled. As a result, the seat back 3 can be moved to a raised posture in which it is raised with respect to the seat cushion 2 or to a folded posture (the state shown by broken lines of FIG. 1) in which it is folded onto the seat cushion 2. Further, the tumble mechanisms 10A correspond to a pivot mechanism of the present invention.

In particular, as well shown in FIG. 1, the tumble mechanisms 10A may include a pair of right and left tumble mechanisms 10A that are provided to the front side of the seat cushion 2. As best shown in FIG. 2, each of the tumble mechanisms 10A has a member fixed to the vehicle floor F (a floor-side member B), a member fixed to the lower surface of the seat cushion 2 (a seat-side member 12), and a hinge portion 13 that connects these two members so as to pivot relative to each other. With this construction, the seat-side member 12 can pivot about a pivot center 13a of the hinge portion 13 so as to be pivoted upwardly and downwardly. As shown in FIG. 1, when the seat-side member 12 is pivoted upwardly and downwardly, the seat 1 in the folded posture can be pivoted upwardly and downwardly with respect to the vehicle floor F.

The pivoting range of the seat 1 corresponds to a range between a pivot start position De1 (the position shown by broken lines) in which the seat 1 is downwardly pivoted so as to be positioned on the vehicle floor F and a pivot end position Ar1 (the position shown by solid lines) in which the seat 1 is upwardly pivoted by 90 degrees toward the forward direction of the vehicle. As best shown in FIG. 2, this pivoting range is restricted by engaging an engagement portion 12b formed in the seat-side member 12 with a stopper Bs formed in the floor-side member B when the seat 1 is pivoted to the pivot end position Ar1 (the position shown by solid lines). Further, the engagement portion 12b is positioned at a leading end of pivot of the seat-side member 12. Further, in FIG. 2, conditions respectively corresponding to the pivot start position De1 of the seat 1 and an intermediate position of pivot of the seat 1 are shown by broken lines.

Further, each of the tumble mechanisms 10A is provided with a torsion spring member 14 which biases the seat-side member 12 counterclockwise in FIG. 2, i.e., in the direction toward the pivot end position Ar1 from the pivot start position De1.

The torsion spring member 14 is a known spiral spring. That is, the torsion spring member 14 has a spiral configuration that is aligned with a direction perpendicular to the axial direction. Therefore, the torsion spring member 14 has a compact configuration that does not occupy much space in the axial direction. The core end of the torsion spring member 14 is formed as a support section 14a that is attached to the floor-side member B. The support section 14a may function as a center of twist of the torsion spring member 14. Conversely, the outer end portion of the torsion spring member 14 is formed as a biasing section 14b mounted to the seat-side member 12. Further, spring members other than the spiral spring described above can be used as the torsion spring member 14. Examples of usable spring members may include a known coil spring having a spiral configuration that extends along the axial direction and a spring member generating torque that can change depending upon the twist angle thereof, e.g., a torsion bar-shaped torsion spring.

In particular, as best shown in FIG. 2, the torsion spring member 14 is positioned such that the support section 14a or the core end portion thereof is outwardly spaced apart in a radial direction (the direction perpendicular to the axial direction) from the pivot center 13a of the hinge portion 13. The support section 14a is integrally attached to the floor-side member B. Conversely, the biasing section 14b or the outer pivoting end engages a protruding engagement pin 12a that is integrally provided to the seat-side member 12. The biasing section 14b is formed as a hook-shaped bent portion that can engage the engagement pin 12a from below in a scooping up manner. Further, the torsion spring member 14 is assembled in a previously twisted condition, so as to bias the biasing section 14b counterclockwise in FIG. 2. Thus, due to the action of the restoring force of the torsion spring member 14, the biasing section 14b normally biases the seat-side member 12 counterclockwise with respect to the floor-side member B. Further, the above-mentioned support section 14a is disposed within a pivoting range between the pivot start position De1 and the pivot end position Ar1 in which the biasing section 14b pivots about the pivot center 13a. In particular, the support section 14a is disposed in an intermediate position between the pivot center 13a and the biasing section 14b when the biasing section 14b pivots by 45 degrees from the pivot start position De1 (the position shown by the broken lines in FIG. 2).

FIG. 3 shows how the twist angle α of the torsion spring member 14 changes. In this drawing, the pivot angle θ means the pivot angle of the biasing section 14b about the pivot center 13a. The twist angle α means the pivot angle (a twist angle) of the biasing section 14b about the support section 14a of the torsion spring member 14.

Each of the pivot angle θ and the twist angle α is defined as a clockwise angular deviation of the biasing section 14b from the pivot end position Ar1 which corresponds to 0 degrees. Further, the solid plot dots in this drawing indicate the pivoting positions of the biasing section 14b, which positions correspond to 10 degrees increments of the pivot angle θ. Thus, as will be recognized from this positional relation, the pivot angle θ may have a pivot range up to 90 degrees, whereas the twist angle α may have a pivot range greater than 90 degrees. The pivot range of the twist angle α is theoretically 147.4 degrees. Also, the rate of change of the pivot angle θ of the biasing section 14b and the rate of change of the twist angle α are always different from each other. In particular, when the biasing section 14b is positioned at pivot regions closer to the pivot start position De1 and the pivot end position Ar1, the rate of change of the twist angle α is smaller than the rate of change of the pivot angle θ. Conversely, when the biasing section 14b is positioned at a pivoting region closer to 45 degrees, the rate of change of the twist angle α is larger than the rate of change of the pivot angle θ.

FIG. 4 shows the relation between the twist angle α of the torsion spring member 14 and the generated torque T. The relation as shown in FIG. 4 corresponds to the properties of a commonly used torsion spring member. That is, the generated torque T generated by the torsion spring member 14 may linearly change with the change of the twist angle α due to the relation with its spring constant. Thus, as will be appreciated from the positional relation of FIG. 3, the generated torque T generated by the spring member 14, when converted based on the rate of change of the pivot angle θ, does not linearly change as stated above and instead changes in a curve as represented by a generated torque curve Tc1 indicated by the solid line of FIG. 5. Further, the solid plot dots in this drawing correspond to the solid plot dots shown in FIGS. 3 and 4. That is, these dots represent the generated torque T of the torsion spring member 14 corresponding to the 10 degrees increments of the pivot angle θ. The generated torque T represented by the solid plot dots corresponds to values of the torque generated about the pivot center 13a of the torsion spring member 14. The open plot dots represent the generated torque T generated around the support section 14a of the torsion spring member 14. Thus, the generated torque T may linearly change with the change of the pivot angle θ.

The relation between the generated torque T indicated by the open plot dots and the generated torque T indicated by the solid plot dots can be explained with reference to FIG. 3. That is, first, the generated torque T indicated by the open plot dots in FIG. 5 corresponds to values of the torque generated at the biasing section 14b positioned at a distance L1 with respect to the support section 14a. Conversely, the generated torque T indicated by the solid plot dots corresponds to values of the torque generated at the biasing section 14b positioned at a distance L2 with respect to the pivot center 13a. That is, the generated torque T indicated by the solid plot dots corresponds to values of the torque obtained by converting values of the generated torque T indicated by the open plot dots about the pivot center 13a based on a ratio of the distance L1 to the distance L2.

Further, in FIG. 5, a gravitational moment curve Mc1 indicated by a dashed line represents a change in gravitational moments M about the pivot center 13a of the seat 1. As shown in FIG. 3, the gravitational moments M correspond to moment values about the pivot center 13a (a distance L3) of a center of gravity G of the seat 1 including the seat-side member 12. Further, it should be noted that the shape of each of the generated torque curve Tc1 and the gravitational moment curve Mc1 shown in FIG. 5 is an example. In other words, with regard to the generated torque curve Tc1, the shape thereof can be changed by changing setting conditions, e.g., a spring constant of the torsion spring member 14 and an arrangement (the ratio of the distance L1 to the distance L2) of the support section 14a. Also, with regard to the gravitational moment curve Mc1, the shape thereof can be changed by changing setting conditions, e.g., a weight of the seat 1 and a position of the center of gravity (the distance L3).

Thus, as shown, for example, in FIG. 5, the shapes of the two curves can be approximated to each other by determining each of the setting conditions described above. In this drawing, the generated torque curve Tc1 is somewhat below the gravitational moment curve Mc1 in a region adjacent to the pivot start position De1 and the pivot end position Ar1. To the contrary, the generated torque curve Tc1 is somewhat above the gravitational moment curve Mc1 in a middle region between these end positions (45 degrees). Further, in the former, that is, in the region in which the generated torque curve Tc1 is below the gravitational moment curve Mc1, in order to upwardly pivot the seat 1, it is necessary for a user to apply a pivot operation force to the seat to compensate for the shortage of the generated torque T of the torsion spring member 14. To the contrary, in the latter, that is, in the region in which the generated torque curve Tc1 is above the gravitational moment curve Mc1, the seat 1 can be automatically upwardly pivoted without the pivot operation force of the user. That is, in both of the regions described above, the operation force required for pivoting the seat 1 upwardly and downwardly can be reduced. In addition, because the shapes of the two curves are close to each other, changes of the required operation force are minimized. Therefore, it is possible for the user to perform a pivot operation smoothly. Further, when the seat 1 is positioned at the pivot start position De1, the seat 1 cannot be automatically upwardly pivoted. Therefore, the seat 1 can be immovably retained on the vehicle floor F. That is, the seat 1 positioned at the pivot start position De1 can be prevented from spontaneously moving upwardly. As a result, the seat 1 can be prevented from rattling.

Next, as best shown in FIG. 1, the lock mechanisms 20 may include a pair of right and left lock mechanisms 20 that are provided to the rear side of the seat cushion 2. Each of the lock mechanisms 20 has a hook 21 that can engage a gate-shaped striker S fixed to the vehicle floor F. The hook 21 is constructed to be protruded and retracted with respect to a jaw-shaped main body of the lock mechanism 20 and is normally biased in the protruding direction so as to engage the striker S. Thus, when the seat 1 is positioned at the pivot start position De1, the hook 21 can engage the striker S, so that the rear side portion of the seat cushion 2 can be locked to the vehicle floor F. As a result, an upward pivot operation of the seat 1 can be prohibited. The lock condition of the lock mechanism 20 thus produced can be released by a release operation of an operation lever (not shown). In particular, when the release operation is performed, the hook 21 is moved to a retracted position so as to be disengaged from the striker S.

Further, in order to improve the operability for lock and release, the lock mechanism 20 is provided with a clearance (play) that permits some amount of movement in the upward pivot direction of the seat 1 even if the hook 21 engages the striker S. As a result, the seat 1 can be moved upwardly from the vehicle floor F within a range corresponding to the clearance of the lock mechanism 20. However, the seat 1 can be prevented from automatically upwardly pivoting by the biasing force of the torsion spring member 14 when the seat is positioned at the region closer to the pivot start position De1. Therefore, the seat 1 can be immovably retained on the vehicle floor F. This configuration reduces the possibility of when a passenger sits on the seat 1, the seat 1 could possibly fall toward and impact the vehicle floor F because the seat 1 cannot move upwardly from the vehicle floor F within the range corresponding to the clearance.

Subsequently, an operation of the pivot mechanism of this embodiment will be described.

As shown by the broken lines of FIG. 1, the seat 1 is positioned at the pivot start position De1 in a folded condition. In particular, each of the lock mechanisms 20 engages the striker S, so that the seat 1 is locked to the vehicle floor F.

First, the release operation of the operation lever (not shown) is performed, thereby releasing the lock mechanism 20. Thereafter, the seat 1 is pivoted in the upward pivot direction thereof. As a result, the seat 1 is upwardly pivoted while it is pivoted about the pivot center 13a. At this time, the upward pivot operation of the seat 1 can be performed with a relatively small force. When the seat 1 is upwardly pivoted to a certain degree (an angle of around 45 degrees), the seat 1 is automatically upwardly pivoted by the biasing force of the torsion spring member 14. After the seat 1 is upwardly pivoted to a position closer to the pivot end position Ar1, the seat 1 can be upwardly pivoted to the pivot end position Ar1 when a small pivot operation force is applied thereto by the user. Thus, the seat 1 can be retracted to the retracted position (the position shown by the solid lines).

Further, the seat 1 that is positioned at the retracted position can be downwardly pivoted onto the vehicle floor F by performing procedures reverse to the procedures described above. That is, the seat 1 is downwardly pivoted while the small force is applied thereto by the user. As a result, the seat 1 is moved on the vehicle floor F. At this time, the lock mechanism 20 automatically engage the striker S, so that the seat 1 is locked to the vehicle floor F.

In this way, according to the pivot mechanism (the tumble mechanisms 10A) of this embodiment, the generated torque T of the torsion spring member 14 can be changed in a curve with respect to the change of the pivot angle θ of the seat 1. Therefore, as compared with a case in which the generated torque of the torsion spring member 14 changes linearly, the generated torque curve Tc1 can be easily controlled to approximate the gravitational moment curve Mc1. That is, the operation force required for the pivot operation of the seat 1 can be easily controlled to be substantially stabilized regardless of changes of an angular position of pivot thereof. Also, according to the present pivot mechanism, a heavy object such as the seat 1 in this embodiment can be pivoted with a substantially constant small force. Further, when the seat 1 is upwardly pivoted to the position closer to the pivot end position Ar1, the generated torque T is less than the gravitational moments M. Therefore, the seat 1 can be upwardly pivoted while it is prevented from being excessively rapidly upwardly pivoted. Further, when the seat 1 is positioned closer to the pivot start position De1, the generated torque T is also less than the gravitational moments M. Therefore, the seat 1 can be prevented from spontaneously moving upwardly. As a result, the seat 1 can be prevented from rattling on the vehicle floor F. Further, since the torsion spring member 14 is composed of the spiral spring, it can be compactly positioned in a width direction of the seat 1.

Second Embodiment

Figure 6:
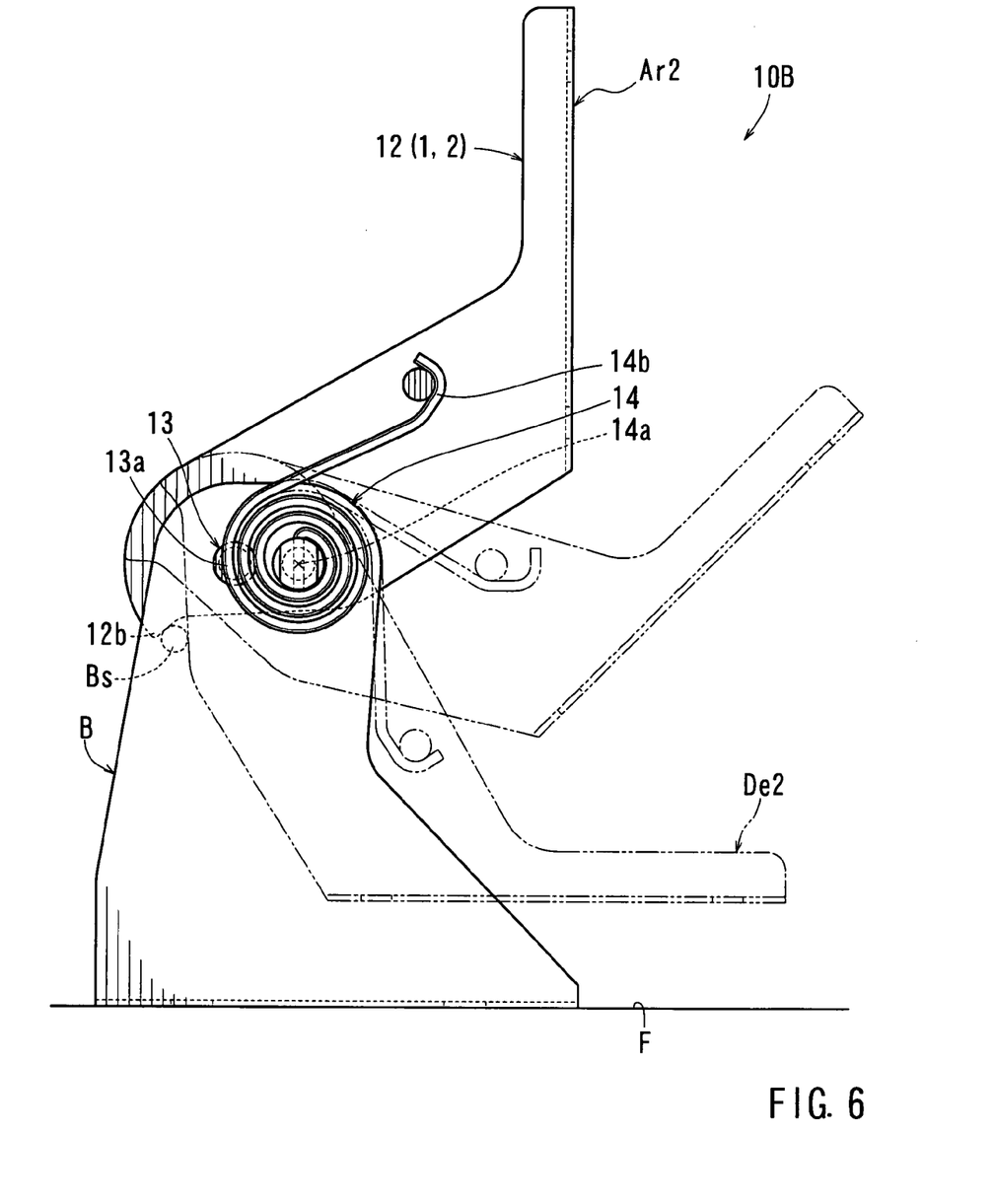
FIG. 6 is a view illustrating a construction of a tumble mechanism according to a second embodiment of the present invention.
Figure 7:
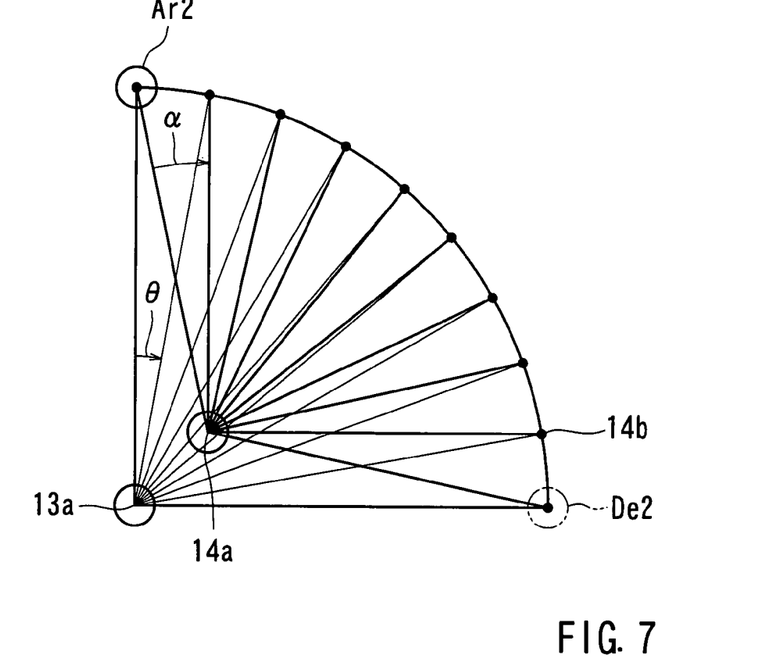
FIG. 7 is a view schematically illustrating a relation between a pivot angle and a twist angle.
Figure 8:
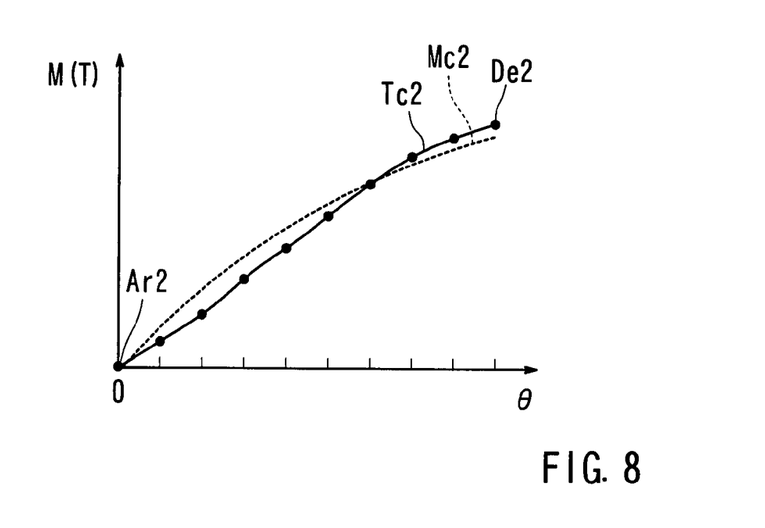
FIG. 8 is a view illustrating a relation between the pivot angle and respective action moments.

Subsequently, a construction of a pivot mechanism according to a second embodiment will be described with reference to FIGS. 6 to 8. FIG. 6 is a view illustrating a construction of a tumble mechanism 10B. FIG. 7 is a view schematically illustrating a relation between a pivot angle θ and a twist angle α. FIG. 8 is a view illustrating a relation between the pivot angle θ and respective action moments. In this embodiment, elements that have substantially the same construction and operation as those of the pivot mechanism (the tumble mechanisms 10A) of the first embodiment will be identified by the same reference numerals and a description of such elements may be omitted.

As best shown in FIG. 6, in the tumble mechanism 10B of this embodiment, the support section 14a of the torsion spring member 14 is disposed in a position that is closer to the pivot center 13a. In particular, the support section 14a is positioned at a mid position between the position of the support section 14a of the first embodiment (FIG. 2) and the pivot center 13a. That is, the support section 14a is positioned such that the ratio of the distance between the support section 14a and the pivot center 13a to the distance between the support section 14a and the biasing section 14b is 1:3.

Further, FIG. 7 shows how the twist angle α of the torsion spring member 14 changes. As will be seen from this drawing, as compared with the first embodiment (FIG. 3), the difference between the rate of change of the twist angle α and the rate of change of the pivot angle θ is generally small. Therefore, as best shown in FIG. 8, as compared with the first embodiment (FIG. 5), a generated torque curve Tc2 of the torsion spring member 14 has a gently curved shape that is more approximated to the shape of a gravitational moment curve Mc2. As a result, the difference between the shapes of these two curves may also change gently. Thus, the seat 1 can be pivoted between a pivot start position De2 and a pivot end position Ar2 with a further stabilized small force.

Because an operation of this embodiment is the same as the first embodiment, a description thereof will be omitted.

In this way, according to the pivot mechanism (the tumble mechanisms 10B) of this embodiment, the generated torque curve Tc2 of the torsion spring member 14 can be controlled so as to have a relatively gentle shape. Thus, changes of the operation force required for the pivot operation of the seat 1 can be reduced, so that the operation force can be further stabilized.

Third Embodiment

Figure 9:
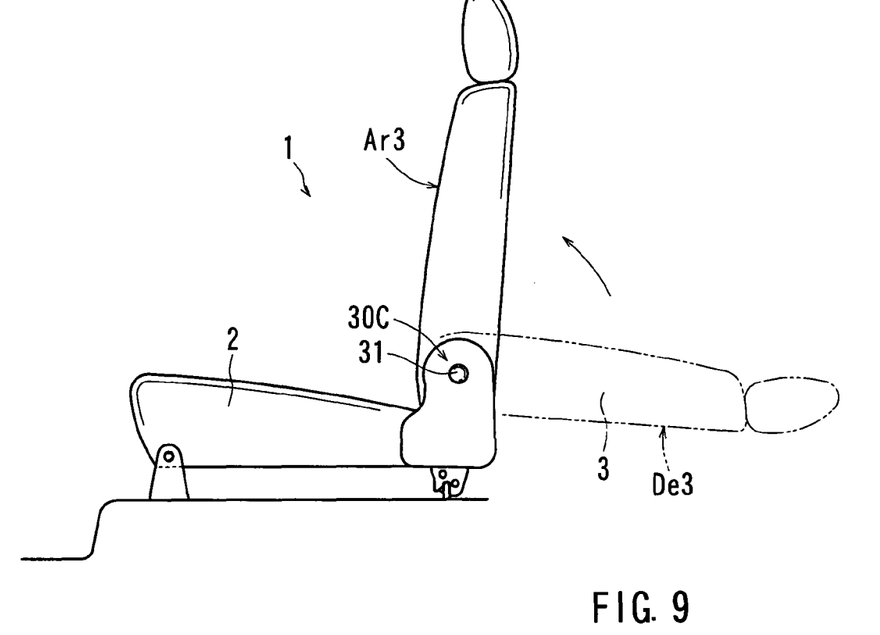
FIG. 9 is a view illustrating an appearance of a vehicle seat according to a third embodiment of the present invention.
Figure 10:
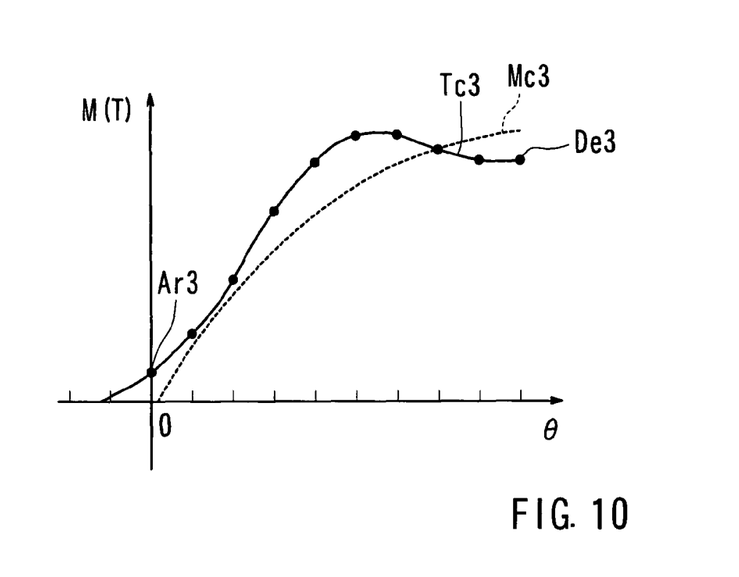
FIG. 10 is a view illustrating a relation between the pivot angle and respective action moments.

Subsequently, a construction of a pivot mechanism according to a third embodiment will be described with reference to FIGS. 9 and 10. FIG. 9 is a view illustrating an appearance of the seat 1. FIG. 10 is a view illustrating a relation between a pivot angle θ and respective action moments. In this embodiment, elements that have substantially the same construction and operation as those of the pivot mechanism (the tumble mechanisms 10A) of the first embodiment will be identified by the same reference numerals and a description of such elements may be omitted.

As best shown in FIG. 9, a pivot mechanism of this embodiment is constructed as reclining mechanisms 30C for adjusting a tilt angle of the seat back 3. The reclining mechanisms 30C connect the seat back 3 as a movable body to the seat cushion 2 as a stationary body, so that the seat back 3 can be pivoted about a pivot center 31.

The reclining mechanisms 30C may include a pair of right and left reclining mechanisms 30C that are provided to the rear side of the seat cushion 2. Each of the reclining mechanism 30C is provided with the torsion spring member 14 that biases the seat back 3 from a pivot start position De3 (a position shown by broken lines) toward a raised position Ar3 (a position shown by solid lines). Further, the pivot end position of the reclining mechanism 30C corresponds to a position in which the seat back 3 is folded onto the seat cushion 2 so as to have a folded posture.

Further, the torsion spring member 14 is disposed between the seat cushion 2 and the seat back 3 in the same manner as the first embodiment, as shown in FIG. 2. That is, as will be seen from FIG. 2, the support section 14a or the core end portion of the torsion spring member 14 is attached to the seat cushion 2. Conversely, the biasing section 14b or the outer end portion of the torsion spring member 14 is attached to the seat back 3. In particular, the support section 14a is disposed in the intermediate position between the pivot center 31 and the biasing section 14b when the biasing section 14b pivots by 45 degrees from the pivot start position De3.

A generated torque curve Tc3 of the torsion spring member 14 of this embodiment is determined in a curved shape as shown in FIG. 10. That is, the generated torque curve Tc3 is determined such that the generated torque T is acted in the rotational direction that the seat back 3 is folded forwardly even if the seat back 3 is in a position in which the pivot angle θ is 0 degrees (the raised position Ar3). This determination can be performed by controlling the initial twisting amount of the torsion spring member 14. As will be seen from this drawing, in the region adjacent to the pivot start position De3, the generated torque curve Tc3 is below a gravitational moment curve Mc3. To the contrary, as will be seen from this drawing, in a pivot region in which the pivot angle θ is decreased, the generated torque curve Tc3 is above the gravitational moment curve Mc3. Therefore, when the seat back 3 is positioned at the pivot start position De3, the seat back 3 cannot be automatically upwardly pivoted. Thus, the seat back 3 positioned at the pivot start position De3 is immovably retained in the pivot position. Further, when the seat back 3 is once upwardly pivoted by manual operation or the like, the seat back 3 can be automatically raised by the biasing force of the torsion spring member 14. In this case, because the generated torque curve Tc3 is somewhat above the gravitational moment curve Mc3, the seat back 3 can be raised while it is prevented from being excessively rapidly pivoted.

Subsequently, an operation of the pivot mechanism of this embodiment will be described.

That is, as best shown in FIG. 9, in a condition in which the seat back 3 is positioned at the pivot start position De3 (the position shown by broken lines), even if the reclining mechanism 30C is switched to a release condition in which the seat back 3 can be pivoted, the seat back 3 is immovably retained in the pivot position. The seat back 3 is then upwardly pivoted by the manual operation or other such operations until the generated torque curve Tc3 is above the gravitational moment curve Mc3 as shown in FIG. 10. Thus, the seat back 3 can be automatically upwardly pivoted by the generated torque T of the torsion spring member 14. As a result, the seat back 3 is gently raised until the seat back 3 reaches the erect attitude position Ar3. Thereafter, the seat back 3 is folded onto the seat cushion 2, so that the seat 1 can be changed to the folded condition.

Further, the seat back 3 positioned at the folded condition can be rearwardly pivoted to the pivot start position De3 by performing procedures reverse to the procedures described above. That is, when the seat back 3 is rearwardly tilted while the small force is applied thereto, the seat back 3 can be moved to the pivot start position De3.

In this way, according to the pivot mechanism (the reclining mechanisms 30C) of this embodiment, the seat back 3 of the seat 1 as a movable component can be pivoted with a substantially stabilized small operation force. Also, the seat back 3 can be prevented from being excessively rapidly pivoted.

Although the present invention is described with reference to the three embodiments, various changes and modifications may be made to the present invention.

For example, in the first and second embodiments, the present pivot mechanism is embodied as the tumble mechanisms for upwardly pivoting the seat in the forward direction of the vehicle. However, the present pivot mechanism can be embodied as tumble mechanisms for upwardly pivoting the seat in the rearward or sideward direction of the vehicle. Similarly, the present pivot mechanism can be embodied as mechanisms for downwardly pivoting the seat in the forward, rearward or sideward direction of the vehicle. Further, the present pivot mechanism can be embodied as mechanisms for pivoting the movable component, e.g., an arm rest that is pivotally attached to the seat. In addition, the present pivot mechanism can be applied to articles other than the vehicle seat. For example, the present pivot mechanism can be used as various types of pivot mechanisms, e.g., mechanisms for pivoting a door.

The position of the support section of the torsion spring member is not limited to the positions in the first and second embodiments. For example, the support section can be positioned closer to the biasing section. Further, the angular position of the support section is not limited to the special angular position of 45 degrees between the pivot start position and the pivot end position. That is, the support section can be positioned at desired angular positions.

The invention claimed is:

1. A pivot mechanism, comprising:
   a stationary body fixed to a desired position;
   a movable body directly coupled to the stationary body by a hinge coupling so as to be pivotable to different pivotal positions within a predetermined angle range, the movable body having only a single pivot center, gravitational force providing gravitational moments acting on the movable body about the pivot center, the gravitational moments changing depending on the pivotal position of the movable body;
   a torsion spring member having a support section that functions as a center of twist of the torsion spring member supported on the stationary body and a biasing section extending from and pivotable about the support section and in engagement with the movable body, the biasing section movable on a pivot trajectory with the movable body as the movable body pivots about the pivot center, the torsion spring member providing a torque biasing the movable body in a pivot direction opposite to the gravitational moments acting on the movable body;

wherein the support section is positioned between the pivot trajectory of the biasing section and the pivot center of the movable body; and wherein the torsion spring member is disposed on the stationary body so as to not be associated with the pivot center of the movable body.

2. A pivot mechanism as defined in claim 1, wherein the support section of the torsion spring member is disposed in a position that is closer to the pivot center than the biasing section.

3. A pivot mechanism as defined in claim 1, wherein the pivot mechanism comprises a mechanism for pivoting a vehicle seat with respect to a vehicle floor or a mechanism for pivoting a movable component of the vehicle seat.

4. A pivot mechanism as defined in claim 2, wherein the pivot mechanism comprises a mechanism for pivoting a vehicle seat with respect to a vehicle floor or a mechanism for pivoting a movable component of the vehicle seat.

5. A pivot mechanism as defined in claim 3, wherein the movable body comprises a seat-side member fixed to the vehicle seat, wherein the stationary body comprises a floor-side member fixed to the vehicle floor, wherein the vehicle seat can be changed to a folded posture in which the seat back is folded onto a seat cushion by a reclining mechanism for controlling an inclination angle of a seat back, and wherein the vehicle seat is pivoted with respect to the vehicle floor in the folded condition.

6. A pivot mechanism as defined in claim 4, wherein the movable body comprises a seat-side member fixed to the vehicle seat, wherein the stationary body comprises a floor-side member fixed to the vehicle floor, wherein the vehicle seat can be changed to a folded posture in which the seat back is folded onto a seat cushion by a reclining mechanism for controlling an inclination angle of a seat back, and wherein the vehicle seat is pivoted with respect to the vehicle floor in the folded condition.

7. A pivot mechanism as defined in claim 5, wherein the torsion spring member comprises a spiral spring.

8. A pivot mechanism as defined in claim 6, wherein the torsion spring member comprises a spiral spring.

9. A pivot mechanism as defined in claim 1 wherein the torque provided by the torsion spring at different pivotal positions provides a torque curve that is non-linear.

10. A pivot mechanism as defined in claim 1 wherein the force acting on the movable body provides a gravitational force curve and the torque provided by the torsion spring at different pivotal positions provides a torque curve that corresponds to the gravitational force curve.

* * * * *